United States Patent
Janz et al.

(10) Patent No.: US 8,353,382 B2
(45) Date of Patent: Jan. 15, 2013

(54) STEERING VALVE HAVING A PLANETARY GEAR TRAIN

(75) Inventors: Bernd Janz, Langenfeld (DE); Jens-Hauke Müller, Wülfrath (DE); Sven Kirschbaum, Mettmann (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/282,596

(22) Filed: Oct. 27, 2011

(65) Prior Publication Data

US 2012/0080256 A1    Apr. 5, 2012

Related U.S. Application Data

(63) Continuation of application No. PCT/EP2010/055593, filed on Apr. 27, 2010.

(30) Foreign Application Priority Data

Apr. 27, 2009 (DE) .......................... 10 2009 018 738
Sep. 17, 2009 (DE) .......................... 10 2009 029 532

(51) Int. Cl.
*B62D 5/04* (2006.01)
*B62D 5/083* (2006.01)

(52) U.S. Cl. .......................... 180/426; 180/429; 180/444

(58) Field of Classification Search .................. 180/444, 180/443, 402, 403, 405, 406, 407, 417, 426, 180/429; 74/388 PS
See application file for complete search history.

(56) References Cited

U.S. PATENT DOCUMENTS

| 3,103,986 | A  | * | 9/1963 | Barton et al. | 180/428 |
|---|---|---|---|---|---|
| 5,762,162 | A  | * | 6/1998 | Bodtker | 180/444 |
| 7,185,576 | B2 | * | 3/2007 | Heitzer | 91/375 A |
| 7,665,572 | B2 | * | 2/2010 | Yamanaka et al. | 180/444 |
| 2004/0060764 | A1 | * | 4/2004 | Kanda et al. | 180/402 |
| 2005/0092948 | A1 |   | 5/2005 | Heitzer |  |

FOREIGN PATENT DOCUMENTS

| DE | 102006055279 A1 | 1/2002 |
|---|---|---|
| DE | 102004049686 A1 | 6/2005 |
| EP | 2010125044 A1 | 11/2010 |
| JP | 2004256087 A | 9/2004 |

OTHER PUBLICATIONS

International Search Report for PCT/EP2010/055593 issued Oct. 6, 2010; 4 pages.

* cited by examiner

*Primary Examiner* — Anne Marie M Boehler
(74) *Attorney, Agent, or Firm* — Summa, Additon & Ashe, P.A.

(57) ABSTRACT

A power steering assembly (20) for a hydraulic power steering system of motor vehicles having at least one hydraulic servo valve with a control element (26) for controlling the steering support dependent upon the relative rotation of the input shaft (22) relative to the output shaft (28), at least two planetary gear trains (30, 40) for transmitting the rotary movement of the input shaft (22) or the output shaft (28) onto the control element (26), and at least one actuator (50) for the relative adjustment of the control element (26) relative to the input shaft (22) or the output shaft (28) in order to influence the steering support characteristic.

15 Claims, 4 Drawing Sheets

STEERING VALVE HAVING A PLANETARY GEAR TRAIN

This nonprovisional application is a continuation of International Application No. PCT/EP2010/055593, which was filed on Apr. 27, 2010, and which claims priority to German Patent Application No. DE 10 2009 018 738.3, which was filed in Germany on Apr. 27, 2009, and German Patent Application No. DE 10 2009 029 532.1, which was filed in Germany on Sep. 17, 2009, and which are all herein incorporated by reference.

BACKGROUND OF THE INVENTION

The present invention is a power steering assembly for a hydraulic power steering system of motor vehicles according to portions of patent claim 1. Furthermore, the invention also relates to a method for a steering support of a hydraulic power steering system of motor vehicles according to the generic portion of patent claim 10.

Among other things, power steering assemblies for hydraulic power steering systems of vehicles comprise servo valves also known as rotary servo valves or rotary slide valves. They control the hydraulic pressure and thus the steering support depending on the steering torque applied by the driver. Most frequently, rotary slide valves are used in which an input shaft connected via a steering column with a steering wheel rotates relative to a valve portion (also referred to as control sleeve or sleeve), which is connected with the output shaft and, in rack-and-pinion steering systems, with a steering pinion (also referred to as pinion). A torque-dependent adjustment of the control element of the servo valve, and thus a torque-dependent valve characteristic, is realized through a torsion system between the input shaft and the control element.

In order to realize various further functions of a torque adjuster, for example a lane departure assistant, over- or understeering assistant, tactile feedback, variable steering support, for instance dependent on the vehicle speed or load, city mode, automatic parking, steering torque superposition, an adjustment of the position of the control element independent from the applied torque is desirable for the purpose of influencing the steering support characteristic of the servo valve.

Such a servo steering valve is described in the published patent application DE 10 2004 049 686 A1. The document discloses an adjusting mechanism for a hydraulic steering valve in which a ring gear of a planetary gear train is mounted non-rotatably and a second ring gear of a second planetary gear train is mounted rotatably. The second ring gear can be rotated to a limited extent through an actuator. The actuator is configured as an electrical actuating element, for example as an electric motor whose rotary movement is converted into a lifting movement. The lifting movement is transmitted onto the rotatable ring gear through a lever. The rotation of the rotatable ring gear causes a rotation of a control element of the servo valve. This permits an adjustment of the relative angle between the control element and an output shaft of the servo valve.

In order to realize the functions of a torque adjuster cited above it is necessary to be able to set very small relative adjustments, particularly relative angles of less than $\frac{1}{10}$ of a degree. According to the prior art, a difference angle between the ring gears is transferred slightly amplified to a relative angle between the control element and the output shaft, due to the transmission ratio of the planetary gear train. Thus, the difference angle set on the rotatably mounted ring gear has to be considerably smaller than $\frac{1}{10}$ of a degree. This requires a highly precise actuator which is expensive for such an application. An articulation of the rotatably mounted ring gear which is almost free from play is also required for the precise adjustment of the difference angle, which, apart from entailing a complicated mechanism, also has adverse effects on production costs. Moreover, a durable and low-maintenance seal between the actuator and the lever for the articulated connection of the ring gear can only be ensured with a lot of effort, because the lever does not execute a linear movement during the adjustment process, but moves along a curved trajectory.

BRIEF SUMMARY OF THE INVENTION

Based on the prior art, the invention is based on the object of further developing the power steering assembly of the type mentioned at the beginning in such a way that the use on inexpensive actuating systems and, in addition, precise adjustment of the control element of a hydraulic servo valve which, in particular, has little play, is enabled. Moreover, it is the object of the invention to provide a compact and space-saving power steering assembly.

Furthermore, it is the object of the invention to provide a method for steering support of a hydraulic power steering system, which enables the use of an inexpensive actuating system and an adjustment of the control element of a hydraulic servo valve that has little play.

With respect to the power steering assembly, these objects are achieved by the features of the patent claim 1, and with regard to the method, by the features of the patent claim 9. Other particularly advantageous embodiments of the invention are disclosed by the dependent claims.

It must be noted that the features cited individually in the patent claims can be combined with each other in any technologically meaningful manner and depict other embodiments of the invention. The description, in particular in connection with the figures, additionally characterizes and specifies the invention.

According to the invention, the power steering assembly for a hydraulic power steering system as it is used, in particular, in motor vehicles comprises at least one hydraulic servo valve, at least two planetary gear trains and at least one actuator.

The hydraulic servo valve substantially comprises an input shaft, an output shaft and a control element. The control element, also referred to as a control member, serves for controlling the steering support dependent upon the relative rotation of the input shaft relative to the output shaft. In this description, the term "control element" is always supposed to mean the cooperation of substantially two functional units, i.e. the control sleeve on the one hand and the control edges on the input shaft side, on the other.

The at least two planetary gear trains, each of which comprise three functional elements, serve for transmitting the rotary movement of a shaft of the hydraulic servo valve, i.e. the input shaft or the output shaft, onto the control element. In this description, the term "functional element" denotes either a sun gear, one or more planet gears or a ring gear of a planetary gear train. The particularly preferred embodiment described herein comprises, for example, planetary gear trains in which the first functional element is a sun gear, the second functional element is one or more planetary gears and the third functional element is a ring gear. However, it should be noted that the planetary gear trains may also be used for the power steering assembly according to the invention, which respectively comprise as a first functional element a ring gear, as a second functional element one or more planetary gears and as a third functional element a sun gear. Consequently, in order to arrive at the subject matter of the invention, it is irrelevant whether a force to be transmitted is introduced via a ring gear into the planetary gear train and is discharged on a sun gear after the transmission, or whether the force to be transmitted is introduced through a sun gear into the planetary gear train and discharged through a ring gear after transmission. A ring gear and a sun gear of a planetary gear train used for the subject matter according to the invention are to be considered equivalent to each other with regard to their function.

The first planetary gear train is associated with the control element of the servo valve and the second planetary gear train is associated with the input shaft or the output shaft of the servo valve, with the first functional element, respectively, for example the sun gear, being connected to the control element or the input shaft or output shaft. The second functional elements, for example the planet gears, are respectively provided for coupling the planetary gear trains. Coupling of the two planetary gear trains is accomplished by means of a common planet carrier which carries the planet gears of the two gear trains, respectively, on common shafts. The second functional elements, for example the planet gears, can in this case rotate on the shafts independently from each other. The third functional elements of the planetary gear trains, for example the ring gears, are mounted so as to be rotatable independently from each other.

The at least one actuator of the power steering assembly according to the invention serves for the relative adjustment of the control element relative to the input shaft or the output shaft. This permits influencing the steering support characteristics. It should be understood that in this case, the rotary movement caused by a driver on the input shaft is always transmitted to the output shaft independently from the activity of the actuator. Even in the case in which, for example, the actuator fails, the normal function of the power steering assembly is ensured.

Compared with the prior art, the power steering assembly according to the invention is characterized in that the at least one actuator rotates the third functional elements of the planetary gear train, for example the ring gears, equidirectionally and at the same time rotates the third functional elements relative to one another. Thus, the actuator sets a difference angle between the third functional elements of the planetary gear train. This difference angle is transferred slightly amplified to a relative adjustment, particularly to a relative angle, between the control element and the input shaft or output shaft by the transmission of the planetary gear trains. With regard to the prior art, the equidirectional rotation with simultaneous relative rotation of the two third functional elements of the planetary gear trains relative to one another for the purpose of setting a comparatively small relative adjustment, in particular a relative angle, between the control element and the input shaft or output shaft, leads to at least the same relative adjustment, in particular the same relative angle, being set between the control element and the input shaft or output shaft as in the prior art, with a—with regard to quantity—large, absolute rotational angle that every third functional element travels through and that is caused by the actuator. In this manner, the device according to the invention increases the adjustment accuracy of the relative adjustment between the control element and the input shaft or output shaft. Moreover, this means that due to the higher adjustment accuracy, less expensive actuators can be used that already meet lower requirements as to adjustment accuracy.

In order to reverse the relative adjustment of the control element relative to the input shaft or the output shaft, the third functional elements of the planetary gear trains, for example the ring gears, in one embodiment of the invention are rotated back into their initial position/zero position by the actuator. Preferably, the power steering assembly according to the invention comprises third functional elements which can respectively be rotated without limitation. In this advantageous embodiment, a reset of the relative adjustment of the control element relative to the input shaft or the output shaft is possible also without rotating back the third functional elements. For this purpose, the actuator merely has to rotate the third functional elements of the planetary gear trains in the same direction as for setting the difference angle in order to again accomplish a relative adjustment of the control element relative to the input shaft or the output shaft required for setting to zero position. This embodiment is particularly suitable for the use of inexpensive actuators. Moreover, this embodiment offers the advantage of an adjustment of the control element that is almost free from play, because both the actuator as well as the planetary gear trains are only rotated in one direction. Alternatively, a planetary gear train that is free from play can also be accomplished by biasing the third functional elements, for example the ring gears.

It may be desired for safety reasons to limit the rotation angle of the first or third functional elements, for example of the sun gears or of the ring gear. To this end, at least one end stop can be provided, for example in the area of these functional elements of the planetary gear trains, which limits the rotation angle of these functional elements and thus the rotatability of the planetary gear train.

Preferably, the actuator is in rotational engagement with the planetary gear trains. In this case, rotational engagement is supposed to mean both a friction-fit as well as a positive-fit type of transmission of a rotary movement from a rotating element of the actuator to a rotating element of a gear train. In particular, this embodiment offers the advantage that the rotary movement of the actuator does not have to be converted into a linear movement in order to be transmitted onto the gear trains, which leads to a particularly compact and space-saving arrangement of the adjusting mechanism including the actuating mechanism. Moreover, the rotary movement of the actuator enables a simple and maintenance-friendly seal between the actuator and the gear train.

In another particularly advantageous embodiment, the actuator is in engagement with the planetary gear trains through two drive gears or a multi-part drive gear. Particularly preferably, however, the actuator is in engagement with the planetary gear trains through a single drive gear. The equidirectional and simultaneous relative rotation of the third functional elements of the planetary gear train, for example of the ring gears, relative to one another by means of a single actuator is thus possible. In particular, this offers the advantage of a simple and space-saving arrangement of the actuator as well as a relative adjustment of the control element that is almost free from play, because the two third functional elements are rotated by only a single actuator. Any possibly existing play is equally distributed to the third functional elements by the one actuator, eliminated by forming the difference angle, and thus has no effect on the relative adjustment of the control element.

In yet another preferred embodiment, the drive gear is a two stage pinion, and the third functional elements, for example the ring gears, respectively comprise different external toothings. This permits the design of an, in particular, maintenance-friendly, positive rotational engagement between the actuator and the third functional elements of the planetary gear trains. Two different transmission ratios, which respectively act from the one actuator on a planetary gear train, can be set in a simple manner by a suitable selection of the external toothings of the third functional elements and the toothings of the two-stage pinion. The difference angle can thus be reduced further at the same absolute angle.

Preferably, a shaft-sealing ring, an O-ring or the like is provided in the power steering assembly according to the invention for sealing between the actuator and the planetary gear train. This constitutes a particularly simple, cost-effective and maintenance-friendly measure for sealing.

Preferably, the actuator of the power steering assembly according to the invention is a stepper motor. This permits rotating the planetary gear trains at predetermined, constant stepped angles, which always leads to a defined rotation angle of the planetary gear trains. Stepper motors are particularly inexpensively available, dependent on their possible smallest step size. The minimum step size required for the subject matter according to the invention permits the use of particularly inexpensive actuators. Furthermore, the actuator may, for example, also be a servo motor or a hydraulic motor.

The method according to the invention for steering support of a hydraulic power steering system as it is used, in particular, in motor vehicles, comprises the following steps:

Controlling the steering support dependent upon the relative rotation of an input shaft relative to an output shaft by means of at least one hydraulic servo valve comprising a control element, Transmitting the rotary movement of the input shaft or of the output shaft onto the control element by means of at least two planetary gear trains, of which, respectively, a first functional element of the one planetary gear train is connected to the input shaft or the output shaft and a first functional element of the other planetary gear train is non-rotatably connected to the control element and a second functional element, respectively, is provided for coupling the planetary gear trains, and Relative adjustment of the control element relative to the input shaft or the output shaft by means of at least one actuator in order to influence the steering support characteristic.

The above order of steps is not to be understood as sequence of execution of the steps in order to arrive at the method according to the invention. Rather, the method steps can be performed in any order, in particular also simultaneously and intermittently.

According to the invention, the two third functional elements (e.g., ring gears) for relative adjustment of the control element are each rotated equidirectionally and simultaneously relative to one another by the actuator. For the definition of the term "functional element", reference is made to the above description of the power steering assembly according to the invention.

The equidirectional rotation and simultaneous rotation of the two third functional elements of the planetary gear trains, for example of the ring gears, relative to one another for the purpose of setting a comparatively small difference angle between these third functional elements, compared with the prior art leads to at least the same relative adjustment, in particular the same relative angle, being set between the control element and the input shaft or output shaft as in the prior art, with a—with regard to quantity—large, absolute rotational angle that every third functional element travels through and that is caused by the actuator. In this manner, the device according to the invention increases the adjustment accuracy of the relative adjustment between the control element and the input shaft or output shaft. Moreover, this means that due to the high adjustment accuracy, less expensive actuators can be used that already meet lower requirements as to adjustment accuracy.

In the method according to the invention, the third functional elements, for example the ring gears, are rotated without limitation. In this advantageous embodiment, a reset of the relative adjustment of the control element relative to the input shaft or the output shaft is possible without rotating back the third functional elements. For this purpose, the actuator merely rotates the third functional elements of the planetary gear trains in the same direction as for setting the difference angle in order to again accomplish a relative adjustment of the control element relative to the input shaft or the output shaft required for again setting to zero position. This embodiment is preferably suitable for the use of inexpensive actuators. Moreover, this embodiment offers the advantage of an adjustment of the control element that is almost free from play, because both the actuator as well as the planetary gear trains are only rotated in one direction.

It may be desired for safety reasons that the rotation of the first or third functional elements, for example of the sun gears or of the ring gear, is limited.

In the method according to the invention, the planetary gear trains are preferably rotated by the actuator while in rotational engagement. For the definition of the term "rotational engagement", reference is made to the above description of the power steering assembly according to the invention. In particular, this embodiment offers the advantage that the rotary movement of the actuator does not have to be converted into a linear movement in order to be transmitted onto the gear trains, which leads to a particularly compact and space-saving arrangement of the adjusting mechanism including the actuating mechanism. Furthermore, the rotary movement of the actuator enables a simple and maintenance-friendly seal between the actuator and the gear train.

In another, particularly advantageous embodiment, the two third functional elements, for example the ring gears, are rotated in the method according to the invention by the actuator by means of a single drive gear which is in rotational engagement with the third functional elements. The equidirectional rotation and simultaneous relative rotation of the third functional elements of the planetary gear trains relative to one another by means of a single actuator is thus possible. In particular, this offers the advantage of a simple and space-saving arrangement of the actuator as well as a relative adjustment of the control element that is almost free from play, because the two third functional elements are rotated by only a single actuator. Any possibly existing play is equally distributed to the third functional elements by the one actuator, eliminated by forming the difference angle, and thus has no effect on the relative adjustment of the control element.

In yet another, particularly advantageous embodiment of the method according to the invention, the two third functional elements, for example the ring gears, each of which has a different external toothing, are rotated by the actuator by means of a two-stage pinion. This permits the design of an, in particular, maintenance-friendly, positive rotational engagement between the actuator and the third functional elements of the planetary gear trains. Two different transmission ratios, which respectively act from the one actuator on a planetary gear train, can be set in a simple manner by a suitable selection of the external toothings of the third functional elements and the toothings of the two-stage pinion.

Other advantages and features of the invention become apparent from the other claims as well as from the following description of exemplary embodiments of the invention, which shall be understood not to be limiting and which will be explained below with reference to the drawing.

DETAILED DESCRIPTION OF THE INVENTION

Figure 1:
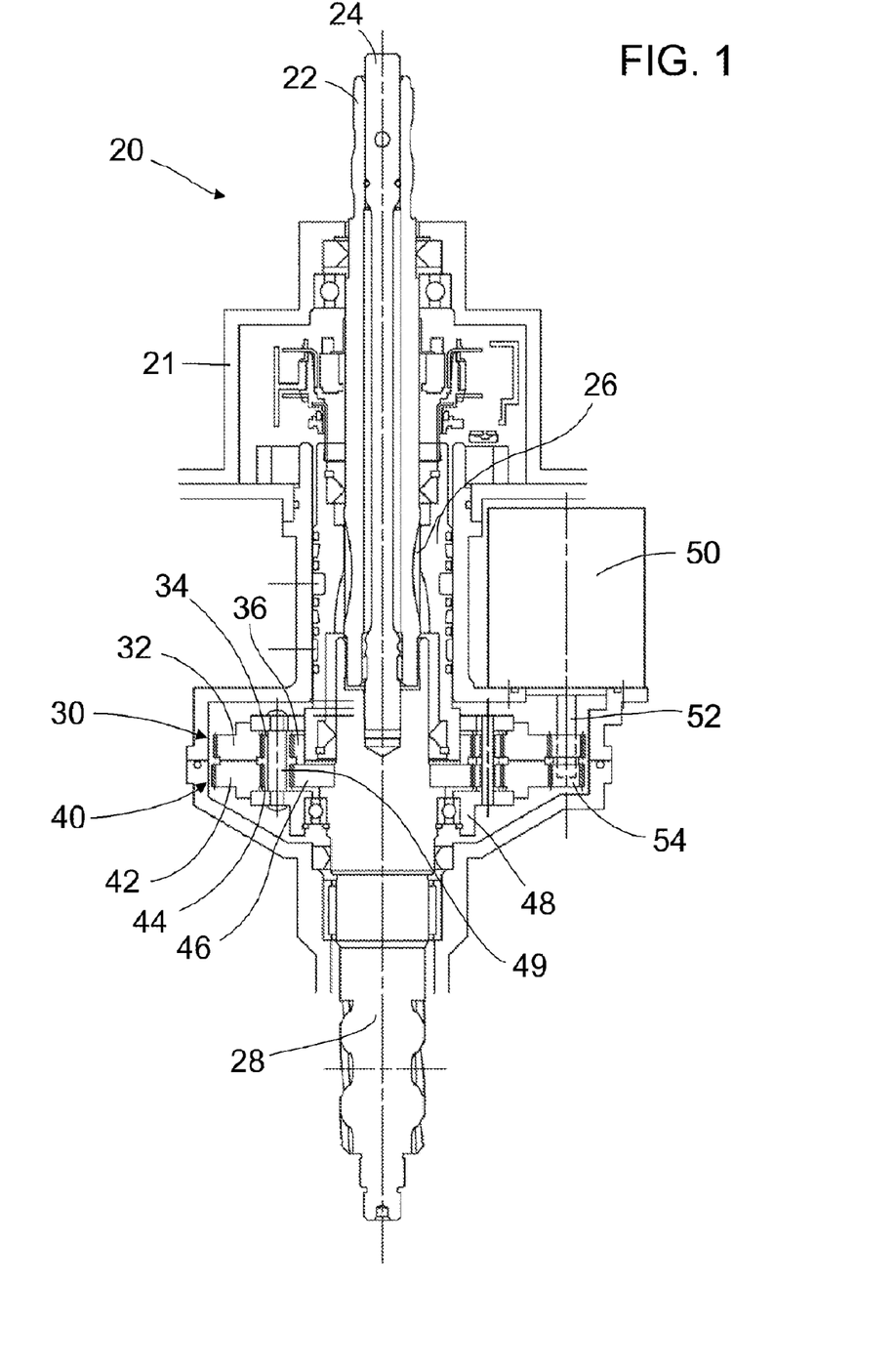
FIG. 1 shows a sectional view along the longitudinal axis of an embodiment of the power steering assembly according to the invention.
Figure 2:
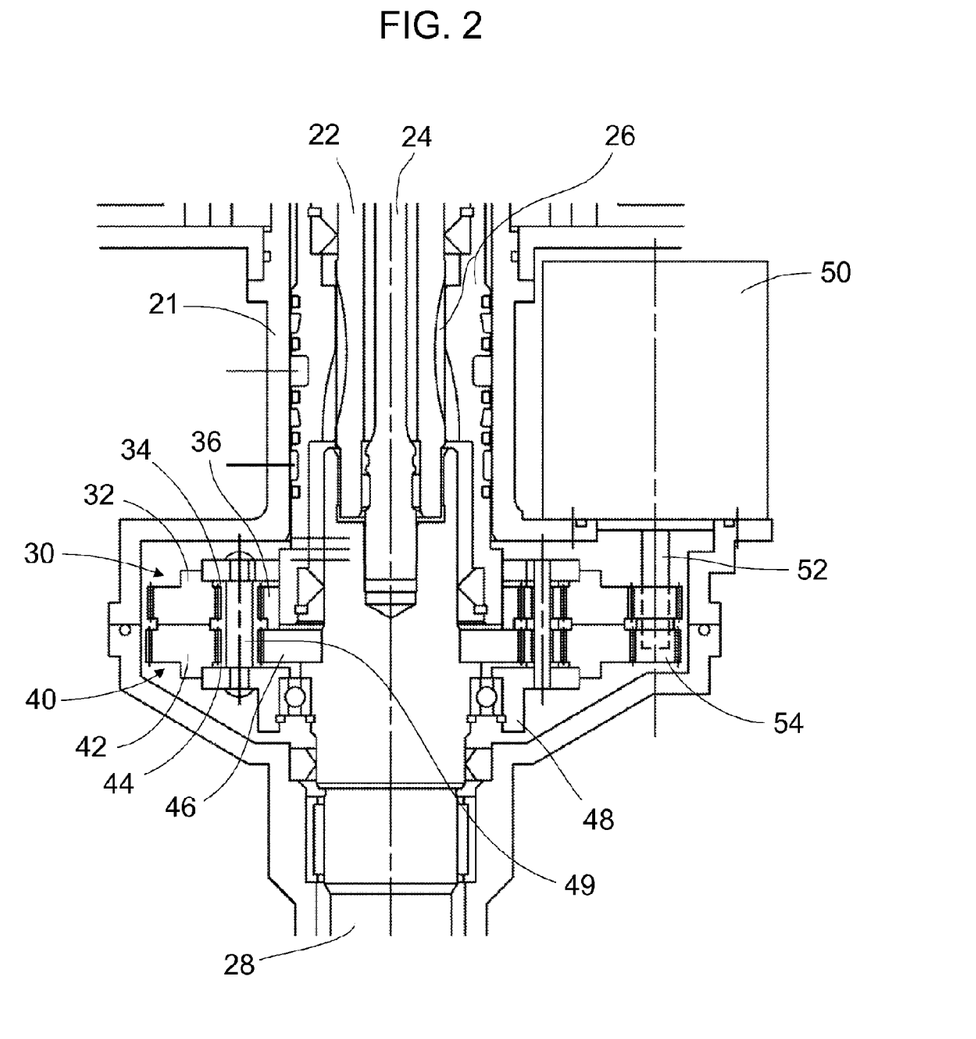
FIG. 2 shows an enlarged detail of the sectional view from FIG. 1.
Figure 3:
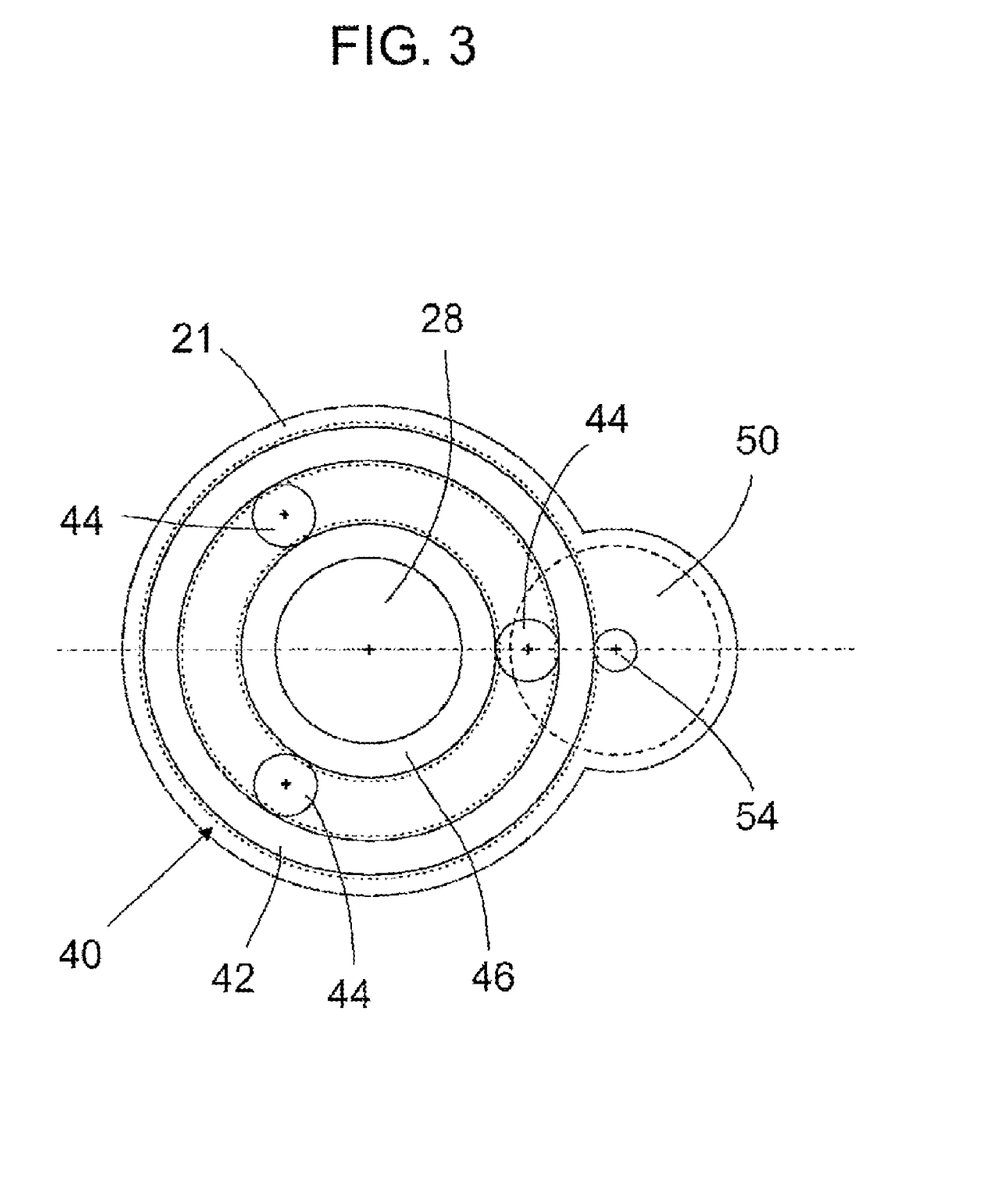
FIG. 3 shows a schematic top view onto a planetary gear train of the power steering assembly according to the invention.
Figure 4:
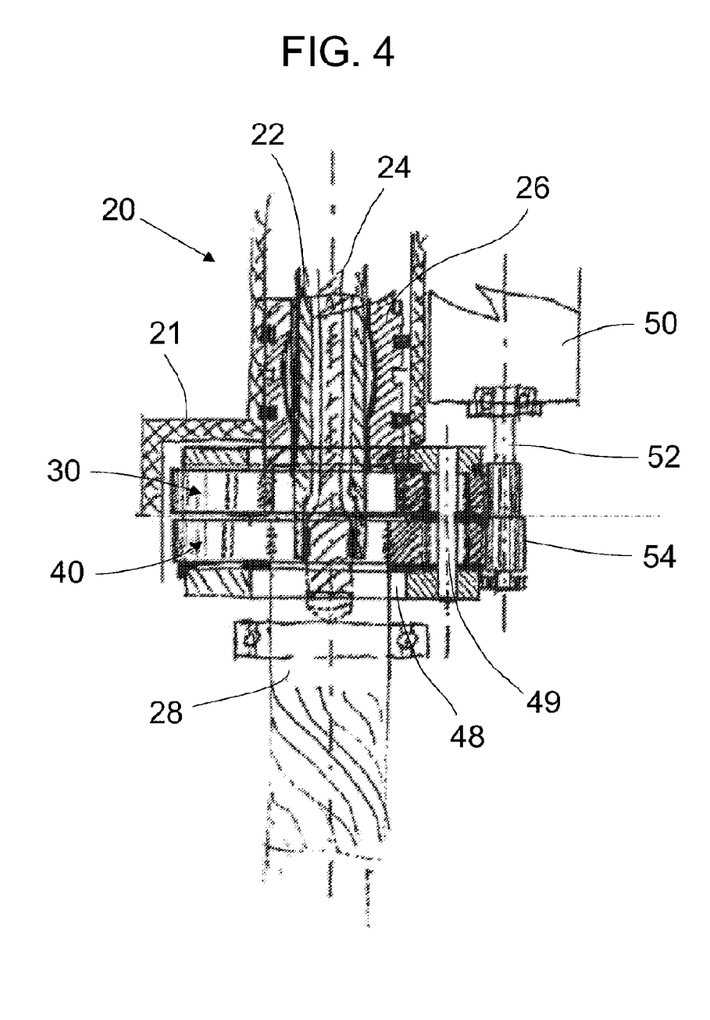

The power steering assembly according to the invention, which is shown in FIGS. 1 to 3 and explained in detail below, merely constitutes a design in which the rotary movement of the output shaft is transmitted to the control element. In this case, a planetary gear train is associated with the control element and the second planetary gear train is associated with the output shaft. In another possible design of the power steering assembly according to the invention, the rotary movement of the input shaft is transferred to the control element, with one planetary gear train being associated with the input shaft and the second planetary gear train being associated with the control element.

FIGS. 1 and 2 show an embodiment of the power steering assembly 20 according to the invention in a sectional view along the longitudinal axis. The power steering assembly 20 shown substantially comprises a hydraulic servo valve, two planetary gear trains 30 and 40 and an actuator 50.

The servo valve substantially comprises an input shaft 22, an output shaft 28 and a control element 26. The input shaft 22 is connected to a steering wheel via a steering column which is not shown. In turn, the output shaft 28 is indirectly connected to wheels to be rotated, which are not shown. The input shaft 22 is connected to the output shaft 28 via a torsion bar 24, which is largely surrounded by the input shaft 22, the torsion bar 24 on its one end being non-rotatably connected to the input shaft 22 and on its other end non-rotatably connected to the output shaft 28. Moreover, a control element 26 is disposed concentrically with and around the input shaft 22. The control element 26 is mounted so as to be rotatable and/or displaceable relative to the input shaft 22.

The servo valve is encompassed by a housing 21. A first planetary gear train 30 and a second planetary gear train 40 are disposed in the housing 21. Each planetary gear train 30, 40 substantially comprises a sun gear 36, 46, several planet gears 34, 44 and a ring gear 32, 42. The first planetary gear train 30 is associated with the control element 26 and the second planetary gear train 40 is associated with the output shaft 28, with the sun gears 36, 44 respectively being non-rotatably connected to the control element 26 or the output shaft 28. The ring gears 32, 42 of the two planetary gear trains 30, 40 are mounted so as to be rotatable independently from each other. Coupling of the two planetary gear trains 30, 40 is accomplished by means of a common planet carrier 48 which carries the planet gears 34, 44 of the two gear trains 30, 40, respectively, on common shafts 49. In this case, the planet gears 34, 44 are mounted so as to be rotatable independently from each other on the shafts 49.

The ring gears 32, 42 of the two planetary gear trains 30, 40 each comprise an external toothing as well as an internal toothing. In particular, the ring gears 32, 42 have different external toothings, with the number of teeth of the ring gear 42 generally being smaller than the number of teeth of the ring gear 32. The ring gear 32 of the first planetary gear train 30 preferably has an external toothing of 130 to 190 teeth, and more preferably 150 to 170 teeth. The ring gear 42 of the second planetary gear train 40 has an external toothing which preferably comprises 1 to 10 teeth, and particularly preferably 1 to 4 teeth less than the external toothing of the ring gear 32. A tuning of planetary gear trains 30, 40 that is particularly suitable for the power steering assembly according to the invention was found if the ring gear 32 has an external toothing of 170 teeth and the ring gear 42 has an external toothing of 169 teeth, or if the ring gear 32 has an external toothing of 150 teeth and the ring gear 42 has an external toothing of 149 teeth.

A two-stage pinion 54 is in rotational engagement with the external toothing of the two ring gears 32, 42. The two-stage pinion 54 also has two different toothings. For example, two-stage pinions with 18 and 17 teeth, 17 and 16 teeth, or 16 and 15 teeth have been found to be particularly advantageous for driving the ring gears 32, 42. The pinion 54 is non-rotatably connected to a drive shaft 52 of an actuator 50.

As can be seen in FIGS. 1 and 2, the actuator 50 is disposed outside the housing 21. In the exemplary embodiment described here, the actuator 50 is an electric motor. In particular, the actuator 50 is a stepper motor with a preferred step size in the range of 0.1 degrees to 10 degrees, in particular 0.5 degrees to 5 degrees, particularly preferably 0.9 degrees. The actuator 50 drives the two-stage pinion 54 directly via the drive shaft 52. At the location where the actuator 50 is attached to the housing 21, the housing 21 has an opening through which the drive shaft 52 including the pinion 54 can be guided for assembly purposes. The seal between the actuator 50 and the planetary gear trains 30, 40 is realized by a shaft-sealing ring, O-ring or the like, which is not shown in FIGS. 1 and 2. The common planet carrier 48 of the two planetary gear trains 30, 40 is rotatably mounted by means of corresponding bearings on the output shaft 28.

FIG. 3 shows a schematic top view onto a planetary gear train of the power steering assembly 20 according to the invention. FIG. 3 shows a planetary gear train 40 which comprises a ring gear 42, three planet gears 44 and a sun gear 46. The sun gear 46 is non-rotatably connected to an output shaft 28. A pinion 54 is in rotational engagement with the external toothing of the ring gear 42 and is directly driven by an actuator 50.

Preferably, the two sun gears 36, 46 of the planetary gear trains 30, 40 each have a diameter in the range of 40 to 60 mm, more preferably 45 to 55 mm, and particularly preferably 45 mm. The sun gears 36, 46 preferably have 80 to 110 teeth, more preferably 85 to 100 teeth, and particularly preferably 90 teeth. Preferably, the planet gears 34, 44 of the planetary gear trains 30, 40 each have a diameter of 5 to 15 mm, more preferably 8 to 12 mm, and particularly preferably 10 mm. The planet gears 34, 44 preferably each have 10 to 30 teeth, more preferably 15 to 25 teeth, and particularly preferably 20 teeth. Preferably, the ring gears 32, 42 of the planetary gear trains 30, 40 each have an internal diameter of 50 to 80 mm, more preferably 60 to 70 mm, and particularly preferably 65 mm. The ring gears 32, 42 preferably each have 110 to 150 teeth, more preferably 120 to 140 teeth, and particularly preferably 130 teeth.

The ring gear 32 of the first gear train 30 preferably has an external diameter of 60 to 90 mm, more preferably 70 to 80 mm, and particularly preferably, of 75 mm. The ring gear 32 of the first gear train 30 preferably has a number of teeth of 120 to 180 teeth, more preferably 140 to 160 teeth, and particularly preferably, of 150 teeth. The ring gear 42 of the second planetary gear train 40 preferably has a number of teeth which is smaller by 1 tooth than the number of teeth of the ring gear 32.

The area of the pinion 54 which is in engagement with the ring gear of the first planetary gear train 30 preferably has a diameter of 6 to 9 mm, more preferably 7 to 8 mm, and particularly preferably 7.5 mm. The area of the pinion 54 which is in engagement with the ring gear 42 of the first planetary gear train 40, preferably has a number of teeth that is selected such that the center distance of the two pairs pinion 54/planetary gear train 30 and pinion 54/planetary gear train 40 is the same.

In another embodiment of the power steering assembly according to the invention which is not shown, the sun gears of the two planetary gear trains each have 98 teeth. The planet gears of the two planetary gear trains each have 16 teeth. Both ring gears of the planetary gear trains comprise an internal toothing of 130 teeth each. The external toothing of the ring gear of the first planetary gear train has 169 teeth. The external toothing of the ring gear of the second planetary gear train has 170 teeth. In the area that is in engagement with the external toothing of the ring gear of the first planetary gear train, the two-stage pinion has 18 teeth, and in the area that is in engagement with the external toothing of the ring gear of the second planetary gear train, 17 teeth.

The mode of operation of the adjusting mechanism of the power steering assembly according to the invention is explained below.

When the actuator 50 rotates the two-stage pinion 54, the two ring gears 32, 42 of the planetary gear trains 30, 40 are also made to rotate due to the rotational engagement with the pinion 54. Because the two ring gears 32, 42 have different external toothings, the result of the rotation is a difference angle between the ring gears 32, 42. This difference angle is transferred slightly amplified to a relative adjustment, particularly to a relative angle, between the control element 26 and the output shaft 28 by the transmission of the planetary gear trains 30, 40. If no relative adjustment is to be set between the control element 26 and the output shaft 28, the two ring gears 32, 42 are held in position through the two-stage pinion 54.

If the input shaft 22 is rotated, the torque is transmitted through the torsion bar 24 onto the output shaft 28. Due to the torque transmission of the torsion bar 24, the latter is rotated, and thus the input shaft 22 relative to the output shaft 28. A steering movement or rotation of the output shaft 28 now leads to a rotation of the sun gear 46, which is non-rotatably connected to the output shaft 28. Since the ring gear 42 associated with the same planetary gear train 40 is retained on its external toothing by the pinion 54, the planetary gears 44 have to roll between the sun gear 46 and the ring gear 42. This process causes the common planet carrier 48 to rotate. Due to the rotation of the planet carrier 48 and the retention of the ring gears 32, 42 of the two planetary gear trains 30, 40 the planet gears 34 of the planetary gear train 30 associated with the control element 26 have to roll off the planetary gear train's ring gear 32. Thus, the rotation of these planet gears 34 causes a rotation of the sun gear 36, which is non-rotatably connected to the control element 26. Due to the identical transmissions of the two planetary gear trains 30, 40 the sun gear 36 associated with the control element 26 is rotated by the same angle as the sun gear 46 associated with the output shaft 28. Therefore, the control element 26 follows the rotation of the output shaft 28.

If a difference angle is now to be set, the two-stage pinion 54 is rotated by the actuator 50. This causes a difference angle between the two ring gears 32, 42 of the planetary gear trains 30, 40. This difference angle is transferred, amplified by the transmission of the planetary gear trains, to a relative adjustment, particularly to a relative angle, between the control element 26 and the output shaft 28.

A first design of the adjusting mechanism has shown that a rotation of the two-stage pinion 54 by +/−230 to 250 degrees, in particular 245 degrees, achieves a relative angle of the sun gears 36, 46 of +/−2 to 3 degrees, in particular 2.5 degrees. This leads to a relative adjustment between the control element 26 and the output shaft 28 of 3 to 4 degrees, in particular 3.5 degrees. The ring gears 32, 42 in this design move by +/−40 to 50 degrees, in particular 45 degrees, which permits a simple reset. If no reset takes place by rotating back the ring gears 32, 42, the two-stage pinion 54 has to be rotated by preferably +/−2 to 12 revolutions, preferably 3.5 to 7 revolutions, in order to again set the relative angle of the sun gear 36, 46 required for setting zero position.

Of course, the present invention is not limited to the exemplary embodiments described above. For example, the power steering assembly according to the invention could also be equipped with more than one actuator, with, for example, one actuator, respectively, driving one planetary gear train.

Furthermore, the actuator could also be formed of a servo motor or a hydraulic motor, generally of any suitable type of motor with which the drive of the planetary gear trains can be realized within the meaning of the invention.

Of course, the number of the planet gears in the planetary gear train described in the exemplary embodiment is not limited to the three planet gears shown in FIG. 3. When considering the torque to be transmitted by a planetary gear train, for example, the person skilled in the art will provide a required and suitable number of planet gears, for instance also four or more.

Moreover, the use of two planetary gear trains that do not have the same transmission is conceivable, so that the rotation of the output shaft is transmitted onto the control element with a different transmission ratio. A self-centering action of the steering system would be made possible in this manner.

Furthermore, the use of further intermediary gear trains in addition to the two planetary gear trains described in the exemplary embodiment is also conceivable in order to further modify the transmission.

The invention claimed is:

1. Power steering assembly (20) for a hydraulic power steering system of motor vehicles, comprising
    at least one hydraulic servo valve with a control element (26) for controlling the steering support dependent upon the relative rotation of the input shaft (22) relative to the output shaft (28),
    at least two planetary gear trains (30, 40) for transmitting the rotary movement of the input shaft (22) or the output shaft (28) onto the control element (26) wherein a first functional element, respectively, of the one planetary gear train (40) is connected to the input shaft (22) or the output shaft (28), and a first functional element of the other planetary gear train (30) is non-rotatably connected to the control element (26), and a second functional element, respectively, is provided for coupling the planetary gear trains (30, 40), and
    at least one actuator (50) for the relative adjustment of the control element (26) relative to the input shaft (22) or the output shaft (28) in order to influence the steering support characteristic,
    wherein the at least one actuator (50) is disposed and configured in such a way that it causes an equidirectional rotation with simultaneous relative rotation of at least two respective third functional elements of the planetary gear trains (30, 40) relative to one another.

2. Power steering assembly according to claim 1, wherein the actuator (50) is in rotational engagement with the third functional elements of the planetary gear trains (30, 40).

3. Power steering assembly according to claim 2, wherein the actuator (50) is in rotational engagement with the third functional elements of the planetary gear trains (30, 40) through a single drive gear.

4. Power steering assembly according to claim 3, wherein the drive gear is a two-stage pinion (54) and the third functional elements each have a different external toothing.

5. Power steering assembly according to claim 2, wherein a shaft-sealing ring or an O-ring is provided for sealing between the actuator (50) and the planetary gear train (30, 40).

6. Power steering assembly according to claim 1, wherein the actuator (50) is a stepper motor or a servo motor.

7. Power steering assembly according to claim 1, wherein the third functional elements are each rotatable without limitation.

8. Power steering assembly according to claim 1, wherein the first functional element is a sun gear (36, 46), the second functional element is one or more planet gears (34, 44) and the third planet gear is a ring gear (32, 42).

9. Method for steering support of a hydraulic power steering system of motor vehicles, comprising the following steps:
controlling the steering support dependent upon the relative rotation of an input shaft (22) relative to an output shaft (28) by means of at least one hydraulic servo valve comprising a control element (26),
transmitting the rotary movement of the input shaft (22) or of the output shaft (28) onto the control element (26) by means of at least two planetary gear trains (30, 40), of which, respectively, a first functional element of the one planetary gear train (40) is connected to the input shaft (22) or the output shaft (28), and a first functional element of the other planetary gear train (30) is non-rotatably connected to the control element (26), and a second functional element, respectively, is provided for coupling the planetary gear trains (30, 40), and
relative adjustment of the control element (26) relative to the input shaft (22) or the output shaft (28) by means of at least one actuator (50) in order to influence the steering support characteristic,
wherein at least two third functional elements are each rotated equidirectionally and simultaneously relative to one another by the actuator (50) for the relative adjustment of the control element (26).

10. Method according to claim 9, wherein the third functional elements of the planetary gear trains (30, 40) are rotated by the actuator (50) while in rotational engagement.

11. Method according to claim 10, wherein the two third functional elements of the planetary gear trains (30, 40) are rotated by the actuator (50) by means of a single drive gear that is in rotational engagement with the third functional elements.

12. Method according to claim 11, wherein the two third functional elements, each of which has a different external toothing, are rotated by the actuator (50) by means of a two-stage pinion (54).

13. Method according to claim 9, wherein the third functional elements are rotated without limitation.

14. Power steering assembly (20) for a hydraulic power steering system of motor vehicles, comprising
at least one hydraulic servo valve with a control element (26) for controlling the steering support dependent upon the relative rotation of the input shaft (22) relative to the output shaft (28),
at least two planetary gear trains (30, 40) for transmitting the rotary movement of the input shaft (22) or the output shaft (28) onto the control element (26) wherein a first functional element, respectively, of the one planetary gear train (40) is connected to the input shaft (22) or the output shaft (28), and a first functional element of the other planetary gear train (30) is non-rotatably connected to the control element (26), and a second functional element, respectively, is provided for coupling the planetary gear trains (30, 40), and
at least one actuator (50) for the relative adjustment of the control element (26) relative to the input shaft (22) or the output shaft (28) in order to influence the steering support characteristic,
wherein the at least one actuator (50) is disposed and configured in such a way that it causes an equidirectional rotation with simultaneous relative rotation of at least two respective third functional elements of the planetary gear trains (30, 40) relative to one another,
wherein the actuator (50) is in rotational engagement with the third functional elements of the planetary gear trains (30, 40) through a single drive gear, and
wherein the drive gear is a two-stage pinion (54) and the third functional elements each have a different external toothing.

15. Method for steering support of a hydraulic power steering system of motor vehicles, comprising the following steps:
controlling the steering support dependent upon the relative rotation of an input shaft (22) relative to an output shaft (28) by means of at least one hydraulic servo valve comprising a control element (26),
transmitting the rotary movement of the input shaft (22) or of the output shaft (28) onto the control element (26) by means of at least two planetary gear trains (30, 40), of which, respectively, a first functional element of the one planetary gear train (40) is connected to the input shaft (22) or the output shaft (28), and a first functional element of the other planetary gear train (30) is non-rotatably connected to the control element (26), and a second functional element, respectively, is provided for coupling the planetary gear trains (30, 40), and
relative adjustment of the control element (26) relative to the input shaft (22) or the output shaft (28) by means of at least one actuator (50) in order to influence the steering support characteristic,
wherein at least two third functional elements are each rotated equidirectionally and simultaneously relative to one another by the actuator (50) for the relative adjustment of the control element (26),
wherein the third functional elements of the planetary gear trains (30, 40) are rotated by the actuator (50) while in rotational engagement by means of a single drive gear that is in rotational engagement with the third functional elements, and
wherein the two third functional elements, each of which has a different external toothing, are rotated by the actuator (50) by means of a two-stage pinion (54).

* * * * *

UNITED STATES PATENT AND TRADEMARK OFFICE
CERTIFICATE OF CORRECTION

PATENT NO. : 8,353,382 B2
APPLICATION NO. : 13/282596
DATED : January 15, 2013
INVENTOR(S) : Janz et al.

It is certified that error appears in the above-identified patent and that said Letters Patent is hereby corrected as shown below:

In the Specification

Column 7, Line 13, reads: "tion, and" and should read: "tion."

Signed and Sealed this
Third Day of September, 2013

Teresa Stanek Rea
*Acting Director of the United States Patent and Trademark Office*